July 7, 1942.                G. P. MARCY                2,288,818
                         REFRIGERATING APPARATUS
                        Filed Nov. 1, 1940          2 Sheets-Sheet 1
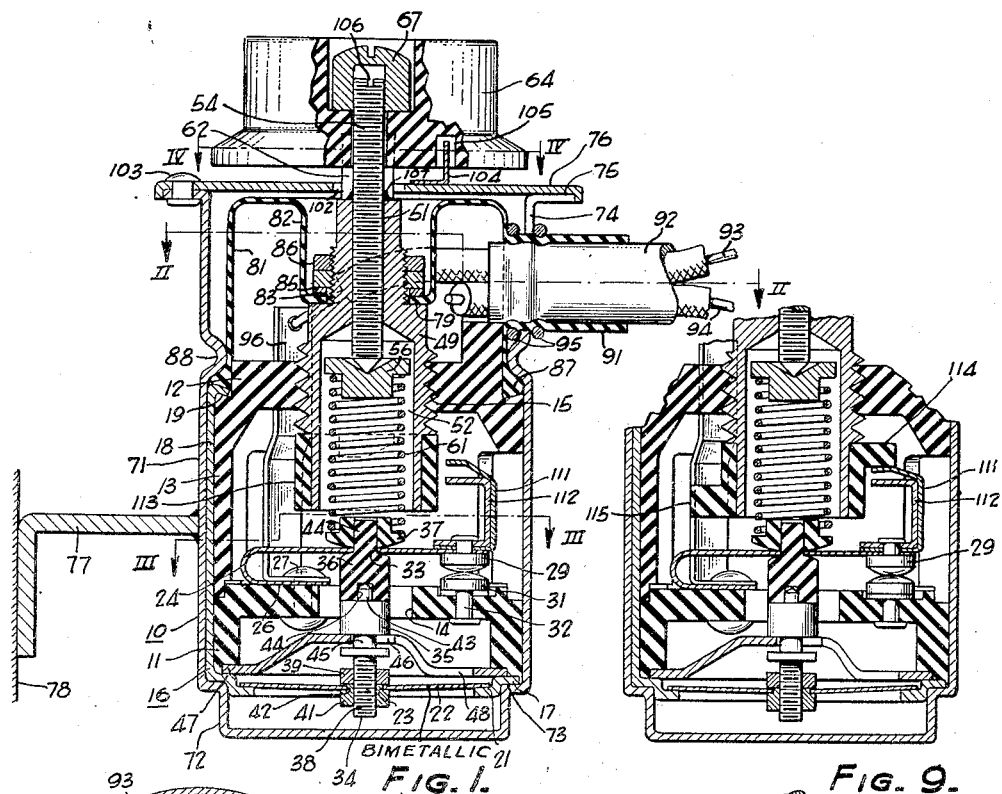
INVENTOR
GERALD P. MARCY July 7, 1942.   G. P. MARCY   2,288,818
REFRIGERATING APPARATUS
Filed Nov. 1, 1940   2 Sheets-Sheet 2

WITNESSES:
H.R. Heintzen
E. H. Lutz

INVENTOR
GERALD P. MARCY
BY
ATTORNEY

Patented July 7, 1942

2,288,818

UNITED STATES PATENT OFFICE 2,288,818

REFRIGERATING APPARATUS

Gerald P. Marcy, Longmeadow, Mass., assignor to Westinghouse Electric & Manufacturing Company, East Pittsburgh, Pa., a corporation of Pennsylvania Application November 1, 1940, Serial No. 363,842

2 Claims. (Cl. 200—138)

This invention relates to thermostatically-controlled switches and more especially to a thermostatically-controlled switch adapted for installation on the cooling unit of a mechanical refrigerator.

One object of the invention is to provide an adjustable sealed thermostatic switch.

Another object of the invention is to provide a novel seal for the adjusting screw of a thermostat.

A further object of the invention is to provide a sealed adjustable thermostatically-operated switch which is economical to manufacture.

An additional object of the invention is to provide a sealed and adjustable thermostatically-operated switch which has means independent of the thermostat for opening and closing the switch and for locking the same in the open or closed position.

These and other objects are effected by my invention as will be apparent from the following description and claims taken in connection with the accompanying drawings forming a part of this application, in which:

Fig. 1 is a sectional view of the thermostatically-controlled switch of this invention;

Fig. 2 is a sectional view on the line II—II of Fig. 1;

Fig. 3 is a sectional view on the line III—III of Fig. 1;

Fig. 6 is an elevation of the cam which closes the switch;

Fig. 7 is an elevation of the cam which opens the switch;

Fig. 9 is a sectional view of the switch of this invention with the contacts locked in the closed position;

Fig. 10 is a sectional view of the switch with the contacts locked in the open position; and, Fig. 11 is a somewhat diagrammatic view of the switch of this invention installed in a domestic refrigerator.

Figure 11:
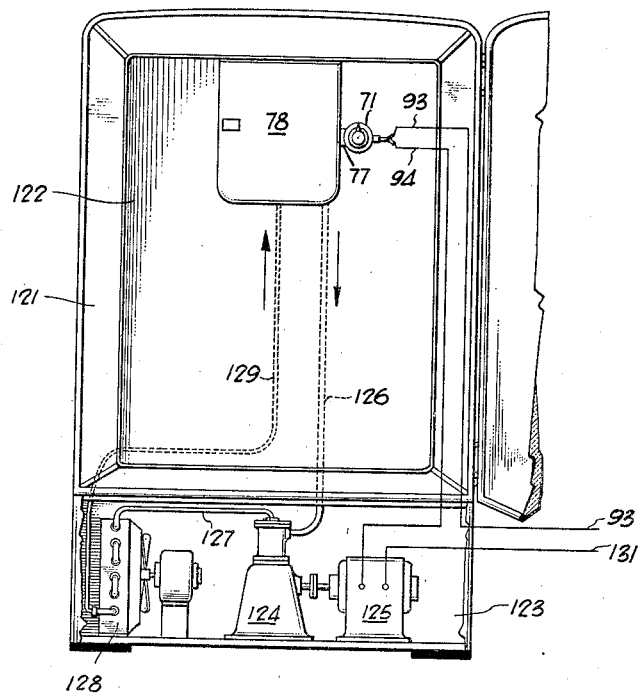
Figure 4:
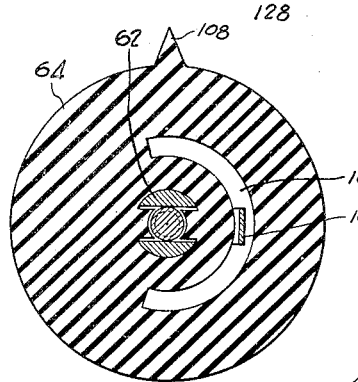
Fig. 4 is a sectional view on the line IV—IV of Fig. 1.
Figure 5:
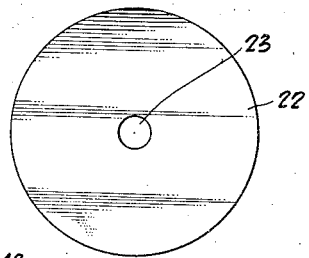
Fig. 5 is a plan view of bi-metallic actuating disc of the invention.
Figure 8:
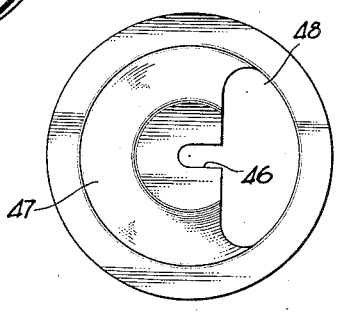
Fig. 8 is a plan view of the travel limiting disc of the switch.

Referring now to the drawings for a detailed description of the invention, the reference numeral 10 designates the frame of the thermostatically-controlled switch. The frame is formed of molded insulating material and comprises a lower cup-shaped member 11 and a disc-shaped upper member 12 provided with three legs 13 which rest on the lower member. Both members 11 and 12 have coaxial vertical central openings 14 and 15 and are clamped together by a metal clip 16 comprising a ring-shaped base 17 and three upwardly-extending arms 18 at the edges of the base 17. The base 17 engages the lower edges of the member 11 and the three upwardly-extending arms 18 lie in grooves on the outer side of the legs 13 of the member 12. The upper ends of the arms are turned inwardly and downwardly to engage a shoulder 19 formed in the outer edges of the disc-shaped portion of the member 12.

The inner edge 21 of the ring-shaped base 17 of the metal clip 16 is depressed to form a seat for a circular, bi-metallic disc 22 which forms the operating element of the thermostatically-controlled switch. The disc 22 has a centrally located opening 23 and is slightly dished so that the central portion thereof snaps upwardly or downwardly in response to changes in temperature, the upwardly-snapping action taking place when the temperature decreases below a certain degree.

A switch blade 24 is located within the frame 10. It comprises a thin strip of metal, one portion of which is bent downwardly into a U configuration and its end 26 is provided with two oppositely-extending lugs which are secured to the lower member 11 by rivets 27. The free end of the switch blade 24 is provided with an electric contact 29 which engages with a second and lower electric contact 31 secured to the lower frame member 11 by a rivet pin 32 integral with contact 31 and extending through the lower member 11. The switch blade 24 has an opening 33 positioned above the central opening 23 of the disc 22 and an operating rod 34 extends through both of said openings 23 and 33 to transmit the motion of the disk 22 to the switch blade 24 to open and close the contacts 29 and 32.

The operating rod 34 comprises a lower disc-engaging portion 35 of metal, a central switch-opening portion 36 of electrical insulating material, and an upper switch-closing portion 37, also of electrical insulating material. The lower portion includes a threaded shaft 38 which extends through the central opening 23 in the disc 22 and is secured to the edges of the same adjacent said opening 23 by two nuts 39 and 41, one on each side of the disc 22. The lower nut 41 has a raised neck 42 which extends through the central opening 23 and engages the upper nut 39. The lower portion has an axial and upwardly-extending pintle 43 which engages an axial opening 44 in the base of the central portion 36 to hold the same in a coaxial position. The central portion 36 also has an axial pintle 44 which extends upwardly through the opening 33 in the switch blade 24. The upper portion 37 is ring-shaped, rests on the switch blade 24, and engages the pintle 44 projecting through the opening 33 thereof. The switch blade 24 is thus clamped between the upper surface of the central portion 36 and the lower surface of the upper portion 37 of the operating rod 34, both of said surfaces being convex to afford maximum angular movement to the switch blade 24.

The central portion 36 of the operating rod 34 has a circumferential cut forming neck 45 which engages a slot 46 in the center of an upwardly dished disc 47 clamped between the ring-shaped base 17 of the metal clip 16 and the base of the lower frame member 11. The central slot 46 of the disc 47 communicates with a larger opening 48 in the disc 47 through which the lower operating rod portion 11 is inserted when assembling the switch, to effect the engagement of the neck 45 of the lower rod portion 11 with the slot 46. The neck 45 of the lower rod portion 11 is longer than the thickness of the disc 47 to permit limited axial travel of the operating rod 34.

The central opening 15 of the upper frame member 12 is threaded to engage the threads of an adjusting spindle 49. The spindle 49 has an axial bore, the upper portion 51 of which is of smaller diameter than the lower portion 52. The upper portion 51 has an internal thread which engages an adjusting screw 54 which extends downwardly into the enlarged portion 52 of the bore. The lower end of the adjusting screw 54 is bluntly pointed and engages a conical depression formed in the upper surface of a plunger 56, to afford substantially frictionless rotation on said plunger 56. Both the plunger 56 and the upper portion 37 of the operating rod 34 have shoulders formed thereon which engage opposite ends of a compression spring 61.

The upper end of the spindle is slotted to form two upstanding prongs 62 which fit into cooperating depressions in the base of the cylindrical knob 64. The knob 64 also has a central hole through which the upper end of the screw 54 extends. A cap nut 67 engages the upper end of the screw 54 to secure the knob 64 tightly on the prongs 62 of the spindle 49. The purpose of the knob 64 is to afford manual rotation of the spindle 49.

The mechanism is enclosed in a cup-shaped metal casing 71 having a section 72 of reduced diameter near its base forming a shoulder 73 which engages the base 17 of the clip 16. The casing 71 has a slot 74 in its side wall near the upper portion thereof and the lips 75 of the casing 71 are turned outwardly for engagement with a cover 76. A metal heat-conducting bracket 77 is brazed to the casing 71, which bracket is adapted for securement to an evaporator 78 of a mechanical refrigerator to secure the thermostatic switch thereto.

The upper portion of the spindle is of reduced external diameter to provide shoulders 79 and is threaded for a portion of its length immediately above the shoulders 79. The space between the spindle and the casing is sealed by a cup-shaped rubber bellows 81, the central portion 82 of which is depressed and provided with a central opening 83, the edges of which are secured against the shoulders 79 by a washer 85 and by two nuts 86 which engage the threads formed above the shoulders 79 of the spindle 49. The rim of the cup-shaped rubber bellows is provided with an outwardly-extending bead 87, which bead lies adjacent the shoulder 19 cut in the outer circumference of the disc of the member 12 and is secured on said shoulder 19 by an inwardly-extending bead 88 rolled in the side wall of the casing 71 to tightly clamp the bead 87 of the rubber bellows 81 between the rolled bead 88 and the shoulder 19.

The bellows is provided with a sidewardly-extending sleeve 91 which passes through the slot 74 of the side of the metal casing 71 and a rubber covered cable 92 carrying the conductors 93 and 94 is secured in said sleeve 91 by two clamping rings 95, one of which is secured on the inside of the casing 71 and the other to the outer side thereof. The clamping rings 95 also secure the cable in position relative to the casing 71. One of the conductors 93 of the cable 92 is secured to the upper end of the metallic strip 96 which passes through an opening 97 in the upper frame member 12 and the lower end of which is secured to the switch blade by one of the rivets 27. The other conductor 94 is secured to one end of a similar metallic strip 98 which passes through an opening 99 in the frame member 12 and the other end of which is secured to the contact 31. When the switch is closed, a continuous electrical conducting circuit is thus established between the two conductors 93 and 94, through the two metallic strips 96 and 98, the switch blade 24, and the two contacts 29 and 31.

The cover 76 has a central opening 102 through which the spindle 49 extends, and is secured to the casing 71 by three rivets 103. A projecting member 104 is secured to the upper surface of the cover 76 which member 104 engages with a semi-circular slot 105 in the under side of the control knob 64 to limit the travel thereof.

The temperature at which the disc snaps upwardly or downwardly varies according to the tension of spring 61. The tension of this spring 61 may be varied by either one of two means. The first means is a factory adjustment and is accomplished by turning the central adjusting screw 54 in the spindle 49 by means of the screw driver slot 106 formed in the upper end of the screw 54. This adjustment is made before the holding nut 67 is secured to the thermostatic switch. After this adjustment is made, the adjusting screw is secured in the spindle by soldering 107 and the adjusting knob 64 and the hold-down nut 67 are secured in place. Thereafter, the adjustment for temperature is effected only by turning the knob 64, which turns the entire adjusting spindle 49 in the threaded opening of the upper frame member 12 and raises or lowers the spindle 49, together with the plunger 56, in accordance with the screw threads on the spindle 49. Movement for rotating the adjusting spindle 49 is provided by the flexibility of the rubber bellows 81. The knob is provided with an indicator pointer 108 and the cover of the casing with indicia (not shown) which cooperate with the pointer 108 to indicate the position of the knob 64.

The switch mechanism also provides for manual movement of the contact to either the open or the closed position and the locking of the contact 29 in either of said positions. To effect this result, two C-shaped strips of metal 111 and 112 are secured to the free end of the switch blade 24 adjacent the contact 29. The C-shaped strips 111 and 112 extend upwardly from the contact 29, and the free ends of the strips 111 and 112 face upwardly and toward the lower portion of the spindle 49, which portion has a ring of insulating material 113 secured thereon on which two cams 114 and 115 are formed diametrically opposite to one another, and one somewhat higher than the other, as best shown in Figs. 9 and 10. The upper cam 114 is provided with an inclined operating face 116 which, when the knob 64 is turned to one of its extreme positions, engages the free end of the C-shaped strip 111, regardless of whether the contact 29 is open or closed and forces the contact 29 to the closed position, if open and retains the contact 29 in said position. This position is shown in Fig. 9. The engagement of cam 114 with the free end of the C-shaped strip 111 occurs preferably when the spindle 49 is turned to its lowermost position.

In a similar manner, and as best seen in Fig. 10, the lower cam 115 engages the free end of the C-shaped strip 112 to open the contact 29 and lock the same in the open position, preferably when the spindle 49 is rotated to its extreme upper position. It will be observed that the opening and closing force exerted by the cams 114 and 115 is transmitted substantially directly to the contact 29 and is not transmitted through the disc 22, so that if the contact 29 freezes for example in the closed position, and the disc 22 cannot open the same, a strong force can be transmitted substantially directly to the contact 29 to break it open.

The switch of this invention may be used in refrigerating apparatus as shown in Fig. 11 in which the reference numeral 121 represents a cabinet having an insulated chamber 122 in the upper portion thereof and a machine compartment 123 below the insulated compartment 122. An evaporator 78 is mounted in the upper portion of the insulated chamber 122 and the thermostatic switch of this invention is mounted adjacent and in heat exchange relationship with the evaporator 78.

The refrigerant supplying apparatus is located in the machine compartment 123 and comprises a compressor 124 driven by an electric motor 125. The compressor 124 withdraws refrigerant vapor from the evaporator 78 through a suction tube 126, and forces it through a tube 127 to a condenser 128 wherein the vapor is liquefied and then returned through a capillary impedance tube 129 to the evaporator 78.

The electric motor 125 receives electrical energy through leads 93, 94, and 131. The thermostatic switch of this invention is interposed between the leads 93 and 94 and opens and closes the contact 29 when the temperature of the evaporator 78, as transmitted to the disc 22 through the casing 71 and the bracket 77, rises or falls to the limits at which the disc 22 is set to snap upwardly or downwardly. The moisture or frost which normally collects on the evaporator 78 will not interfere with the operation of the thermostatic switch because of its sealed construction.

It will be apparent from the above that this invention provides an adjustable and sealed thermostatic switch adapted for installation in moist or freezing atmospheres. The invention further provides means in such a switch for forcibly moving the contacts in the open or closed position and locking the same in said positions.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a thermostatically-controlled switch mechanism, the combination of a cup-shaped casing, switch elements therein, a bimetallic, snap-acting temperature-responsive element in said casing adapted to open and close said switch elements, a rotatable spindle having a portion within said cup-shaped casing and a second portion projecting therefrom, said spindle being operatively connected with said temperature-responsive element to vary its temperature response in accordance with the rotation of said spindle, and a flexible, moisture-proof membrane secured across the mouth of the cup-shaped casing, and about the spindle to allow rotation thereof, said membrane, spindle, and cup-shaped casing forming a portion of a sealed housing containing the switch elements, the temperature-responsive element, and portions of said spindle.

2. In a thermostatically-controlled switch mechanism, the combination of a cup-shaped casing, switch elements therein, a current-conducting wire connected with each of said elements, said wires projecting from the mouth of the cup, a bimetallic, snap-acting temperature-responsive element in said casing adapted to open and close said switch elements, a rotatable spindle having a portion within said cup-shaped casing and a second portion projecting therefrom, said spindle being operatively connected with said temperature-responsive element to vary its temperature response in accordance with the rotation of said spindle, and a flexible, moisture-proof membrane secured across the mouth of the cup-shaped casing, about the spindle and about said projecting wires, said membrane, spindle, wires, and cup-shaped casing forming a sealed housing containing the switch elements, the temperature-responsive element, and portions of said spindle and said wires, the membrane being of sufficient flexibility to allow rotation of said spindle.

GERALD P. MARCY.